UNITED STATES PATENT OFFICE.

HAROLD CECIL GREENWOOD, OF LONDON, ENGLAND.

SYNTHETIC PRODUCTION OF AMMONIA.

1,337,903.  Specification of Letters Patent.  Patented Apr. 20, 1920.

No Drawing.   Application filed February 15, 1918. Serial No. 217,445.

*To all whom it may concern:*

Be it known that I, HAROLD CECIL GREENWOOD, D. Sc., a subject of the King of Great Britain and Ireland, and residing at 10 University Mansions, Putney, London, S. W., England, have invented certain new and useful Improvements in the Synthetic Production of Ammonia, of which the following is a specification.

This invention relates to the synthetic production of ammonia by the action of catalytic materials upon a mixture of hydrogen and nitrogen, and has for its object to provide effective means for the removal of moisture from the gas or gases and for the removal of any carbon monoxid which may be contained therein, the removal being effected before the gases are allowed to enter the catalyst chamber as both the substances referred to act as poisons which would have a deleterious effect on the activity of the catalyst used if they were allowed to come in contact therewith.

According to the present invention I pass the gas or gases over an amid of one of the alkali metals preferably sodamid ($NaNH_2$) before the gases are allowed to enter the catalytic reaction chamber.

In the practical application of the invention the gases may be passed over the sodamid preferably powdered and heated to a moderate temperature, say about 145° C., or just below the melting point either at normal pressure or preferably at increased pressures, the reactions under either condition resulting in the production of ammonia which may of course be allowed to pass with the purified reacting gases through the catalyst chamber in which the synthesis of the reacting gases to form the ammonia is effected.

It is preferred to adopt some pressure above the normal and to provide means for stirring or agitating the sodamid as by so doing the reaction will be made much more rapid.

Before passing over the sodamid the gases are preferably partially dried in a preliminary operation by the use of calcium chlorid or other suitable desiccating agent.

Having now described my invention, what I claim as new and desire to secure by Letters Patent is:—

1. In a process for the synthetic production of ammonia from hydrogen and nitrogen the step which comprises passing either gas over an amid of one of the alkali metals prior to passing the mixture of gases through the catalyst converter.

2. In a process for the synthetic production of ammonia from hydrogen and nitrogen the step which comprises passing the mixture of gases over an alkali metal amid prior to the passage of the gases through the catalyst converter.

3. In a process for the synthetic production of ammonia from hydrogen and nitrogen, the step which comprises passing either gas over a powdered alkali metal amid heated to about 145° C. prior to the passage of the gases through the catalyst converter.

4. In a process for the synthetic production of ammonia from hydrogen and nitrogen, the step which comprises passing the mixture of gases over a powdered alkali metal amid heated to about 145° C. prior to the passage of the gases through the catalyst converter.

5. In a process for the synthetic production of ammonia from hydrogen and nitrogen the step which comprises passing either gas over sodamid prior to the passage of the gases through the catalyst converter.

6. In a process for the synthetic production from hydrogen and nitrogen the step which comprises passing the mixture of gases over sodamid prior to their passage through the catalyst converter.

In testimony whereof I have signed my name to this specification.

HAROLD CECIL GREENWOOD.